Patented Dec. 29, 1936

2,066,160

UNITED STATES PATENT OFFICE 2,066,160

PRODUCTION OF N-VINYL COMPOUNDS

Walter Reppe and Ernst Keyssner, Ludwigshafen-on-the-Rhine, Germany, assignors to I. G. Farbenindustrie Aktiengesellschaft, Frankfort-on-the-Main, Germany No Drawing. Application May 21, 1935, Serial No. 22,562. In Germany May 29, 1934

7 Claims. (Cl. 260—46)

The present invention relates to N-vinyl compounds and a process of producing the same.

We have found that valuable N-vinyl compounds are obtained by reacting acetylene at elevated temperatures with pyrrole compounds, i. e. pyrrole or compounds containing the pyrrole ring, in the presence of substances having a strongly alkaline reaction and belonging to the group of the alkali metals, alkali hydroxides and alcoholates.

As compounds containing the pyrrole ring besides pyrrole itself may be mentioned for example indole, carbazole and naphthacarbazole. The compounds obtainable from the said compounds by the addition of hydrogen or by the introduction of other atoms or atomic groups may be employed provided that they still contain a free NH-group. As substances having a strongly alkaline reaction may be mentioned especially potassium and sodium hydroxides and alcoholates; compounds of the same metals with the initial materials, as for example carbazole potassium, may also be employed and these compounds, which are formed by heating the pyrrole compounds with caustic alkalies, are included in the term "substances having a strongly alkaline reaction" wherever used in the present disclosure. For the reaction a pressure-tight vessel, for example, may be employed into which the acetylene (advantageously under increased pressure) is led, preferably in admixture with inert gases, such as nitrogen, methane or hydrogen. The reaction may also be carried out in a tower, the operation being conducted in stages or continuously. In this case, the acetylene is preferably led through the tower in a cycle.

The reaction may be carried out in the presence of diluents, such as alcohols, as for example methyl, ethyl or butyl alcohol, glycols, as for example ethylene glycol or diethylene glycol, or hydrocarbons, as for example cyclohexane, benzene, toluene, tetrahydronaphthalene or decahydronaphthalene. Solid compounds, such as carbazole, are preferably made into a paste with a diluent of the said kind or with the corresponding vinyl compound which melts at a much lower temperature than the initial material. The reaction proceeds most favorably between 100° and 200° C.

The vinyl compounds obtained may be separated from the alkaline substances and purified by distillation, if desired under reduced pressure, by extraction with suitable solvents or by crystallization. The vinyl compounds of pyrrole and indole are liquid at room temperature and pure vinyl carbazole is a colorless, readily crystallizing compound.

By the careful catalytic hydrogenation the vinyl compounds may be converted into the corresponding ethyl compounds.

The following examples will further illustrate how the present invention may be carried out in practice, but the invention is not restricted to these examples. The parts are by weight, unless otherwise stated.

Example 1

50 parts of pyrrole are treated in the presence of 1.5 parts of potassium hydroxide in a shaking bomb with a mixture of 2 parts by volume of acetylene and 1 part by volume of nitrogen at from 180° to 190° C. under a pressure of 20 atmospheres, fresh acetylene being continuously pressed in. After 70 hours, from 12 to 13 parts of acetylene have been consumed. The vinyl pyrrole, which is of dark color, thus obtained in a good yield is purified by distillation. It is a colorless liquid boiling at 122° C.

In an analogous manner, indole yields vinyl indole which boils at from 70° to 75° C. under a pressure of 1 millimeter (mercury gauge).

Example 2

Acetylene is pressed at from 160° to 170° C. while stirring into a mixture of 500 parts of carbazole, 30 parts of potassium hydroxide and 900 parts of decahydronaphthalene in a pressure-tight vessel until about 85 parts of acetylene have been consumed. By distillation under reduced pressure (15 millimeters) the solvent first passes over and then at from 170° to 180° C. vinyl carbazole passes over and solidifies in crystalline form in the receiver. The yield is about 90 per cent and the melting point from 62° to 64° C.

Example 3

300 parts of carbazole, 50 parts of potassium hydroxide and 1500 parts of ethylene glycol are treated in an iron tower with acetylene at from 160° to 180° C., the acetylene being led through the lower in a cycle. After three days, unconverted carbazole is filtered off. The diluent (which has been partly converted into the vinyl ether by the reaction with acetylene) is then distilled off under reduced pressure, the vinyl carbazole then being distilled.

Example 4

A mixture of 50 parts of tetrahydrocarbazole and 50 parts of cyclohexane is treated with a mixture of 2 parts by volume of acetylene and 1 part by volume of nitrogen in a pressure-tight vessel at from 180° to 190° C. under a pressure of 20 atmospheres in the presence of 1.5 parts of potassium hydroxide, the acetylene consumed being replenished by pressing fresh acetylene into the vessel. After about 20 hours 8 parts of acetylene have thus been added. By distilling the reaction mixture cyclohexane is obtained as a first running and then N-vinyl-tetrahydrocarbazole distills over at from 125° to 130° C. under a pressure of 0.5 millimeter (mercury gauge) being an oily liquid after condensation.

*Example 5*

100 parts of indole are treated with acetylene in the presence of 2 parts of potassium hydroxide at between 150° and 160° C. as described in Example 1. By distilling under reduced pressure N-vinyl indole is obtained as a colorless liquid which boils at between 73° and 76° C. under a pressure of 1 millimeter (mercury gauge).

*Example 6*

100 parts of isopropyl carbazole are treated with acetylene in the presence of 4 parts of potassium hydroxide at 180° C. as described in Example 1. By distilling the reaction mixture N-vinyl isopropyl carbazole boiling at between 145° and 155° C. under a pressure of 0.2 millimeter (mercury gauge) is obtained as a high-viscous oil besides unchanged starting material and polymerization products of a higher boiling point.

What we claim is:—

1. The process of producing N-vinyl compounds which comprises reacting acetylene at a temperature above 100° C. with pyrrole compounds in the presence of a substance selected from the group consisting of the alkali metals, alkali metal hydroxides and alcoholates.

2. The process of producing N-vinyl compounds which comprises reacting acetylene at a temperature above 100° C. with pyrrole compounds in the presence of potassium hydroxide.

3. The process of producing N-vinyl compounds which comprises reacting acetylene at between 100° and 200° C. with pyrrole compounds in the presence of a substance selected from the group consisting of alkali metals, alkali metal hydroxides and alcoholates.

4. The process of producing N-vinyl compounds which comprises reacting acetylene at a temperature above 100° C. with pyrrole compounds in the presence of a substance selected from the group consisting of alkali metals, alkali metal hydroxides and alcoholates and of organic diluents.

5. The process of producing N-vinyl compounds which comprises reacting acetylene at a temperature above 100° C. and under increased pressure with pyrrole compounds in the presence of a substance having a strongly alkaline reaction.

6. The process of producing N-vinyl carbazole which comprises reacting acetylene at a temperature above 100° C. with carbazole in the presence of a substance selected from the group consisting of alkali metals, alkali metal hydroxides and alcoholates.

7. The process of producing N-vinyl carbazole which comprises reacting acetylene at a temperature above 100° C. with carbazole in the presence of potassium hydroxide and of an organic diluent.

WALTER REPPE.
ERNST KEYSSNER.